UNITED STATES PATENT OFFICE.

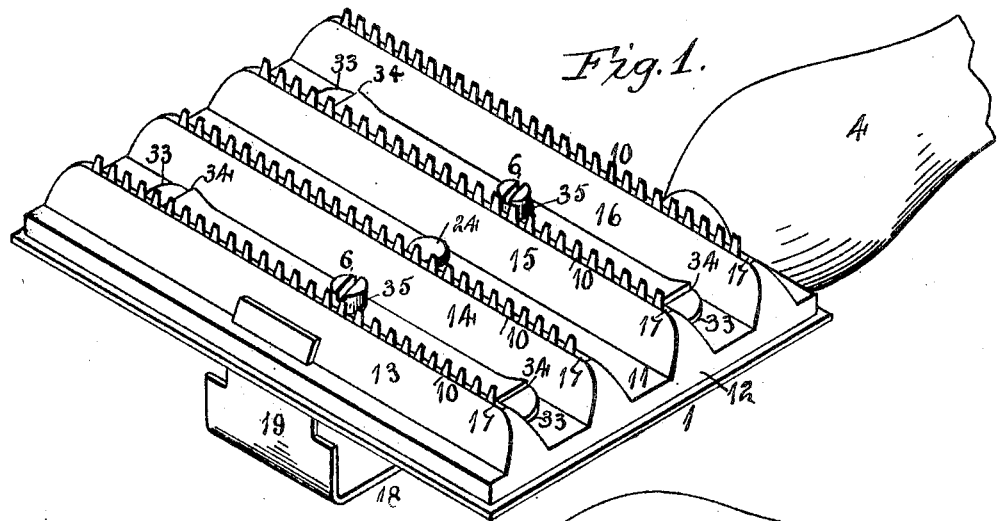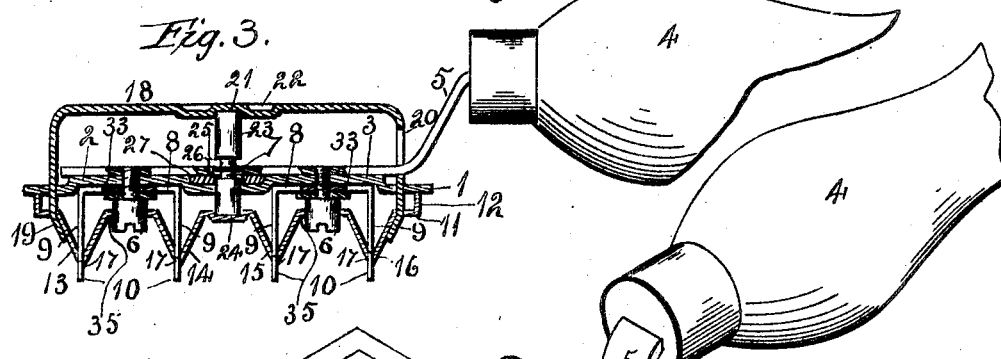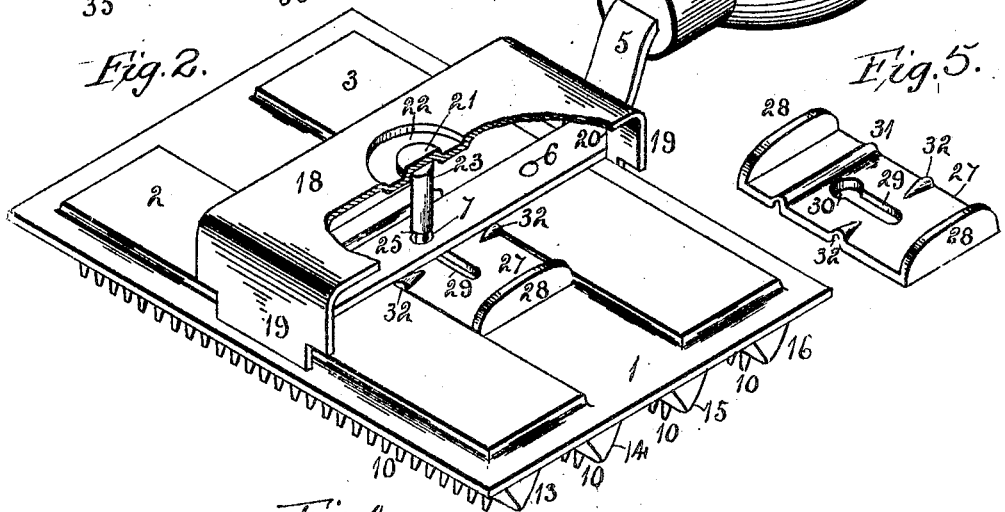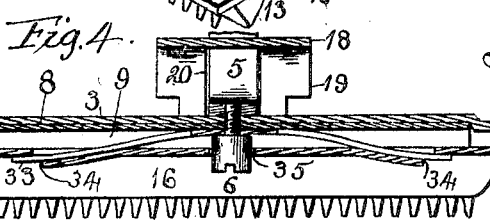

JOHN Q. ADAMS AND JOHN M. ADAMS, OF UNION, ILLINOIS; SAID JOHN Q. ADAMS ASSIGNOR TO SAID JOHN M. ADAMS.

CURRYCOMB.

No. 821,075.　　　　Specification of Letters Patent.　　　Patented May 22, 1906.

Application filed November 7, 1904. Serial No. 231,780.

*To all whom it may concern:*

Be it known that we, JOHN Q. ADAMS and JOHN M. ADAMS, citizens of the United States, residing at Union, in the county of Mc-Henry and State of Illinois, have invented certain new and useful Improvements in Currycombs, of which the following is a specification.

The object of this invention is to construct a currycomb in which the teeth may be covered, thereby producing either a comb or scraper.

In the accompanying drawings, Figure 1 is a perspective view of the currycomb as seen from its under side. Fig. 2 is a perspective view of the currycomb as seen from the top. Fig. 3 is a transverse central vertical section. Fig. 4 is a lengthwise vertical section. Fig. 5 is a perspective view of the sliding plate.

The top plate 1 has two raised portions 2 and 3, extending in the lengthwise direction of the plate. A handle 4 has its shank 5 secured to the raised portions by the screws 6. The shank has an opening 7. The tooth-sections are two in number, each comprising the base 8 and two wings 9. The wings are formed with teeth 10. The base is located within one of the raised portions 2 and 3 of the top plate and held in place by the screws 6. A bottom plate 11 has an edging 12 and four raised portions 13, 14, 15, and 16. Each of the raised portions has a lengthwise opening 17. This bottom plate, edging, and raised portions are stamped from a single piece of material, thereby saving all joints and producing a strong and cheap construction. A plate 18 has depending ends 19, which pass through openings in the top plate and are soldered or secured to the outside of the raised portions 13 and 16. One of the ends has a slot 20, through which the shank 5 of the handle extends. The plate 18 is formed with an annular recess or depression 22, leaving a center section 21 on a plane with the plate. A pin 23 has one end located in the recess formed in the portion 21 and its other end located in a recess 24, formed in the bottom plate 11. The pin has two annular grooves 25 and 26. A plate 27 has upturned ends 28, a lengthwise slot 29, having an enlarged end 30, a raised portion 31, and two raised projections 32. This plate 27 is located in the space between the two raised portions 2 and 3 and is slidable in said space beneath the shank 5 of the handle. The shank 5 will spring up sufficiently to permit the raised projections 32 to pass under it. The pin 23 is located in the slot 29 of the sliding plate.

To the center of the base 8 of each of the toothed sections is secured a flat spring 33 and held in place by the screws 6. The ends of the flat springs extend through openings 34 in the lower plate. These springs form a yielding connection between the top and bottom plates, and the plate 18 has a permanent connection with the bottom plate and a sliding engagement with the top plate.

By pressing down on the plate 18 the bottom plate will be separated from the top plate, which will move the raised portions 13, 14, 15, and 16, so that the teeth will be within the raised portions, thereby presenting the edges of the raised portions as scrapers. The raised portions may be held in this position by sliding the plate 27 so that the slot 29 of the plate will enter the annular groove 25 of the pin.

By moving the sliding plate 27 so that its slot 29 will be in engagement with the annular groove 26 of the pin the teeth will be held projected about one-half of their length, which will form a currycomb having shallow teeth and is very useful on some sensitive animals.

Openings 35 are formed through the lower plate 11 in order that the screws 6 may be placed in position to unite the flat springs, comb-sections, and top plate to the shank of the handle.

The heads of the screws are of a length to fill the openings 35 in the lower plate when the teeth are fully withdrawn, which will exclude all dirt gaining access between the top and bottom plates.

The pin is held in position by the action of the flat springs.

The raised portion 31 on the sliding plate serves as a stop to the movement of the plate in one direction, and the raised projections 32 serve to hold the sliding plate against accidental movement, but permit it to be moved in order that the enlarged opening 30 therein will permit the movement of the pin to bring one of the annular grooves of the pin in line with the slot 29 of the plate.

We claim as our invention—

1. A currycomb provided with teeth, shields for the teeth and means for permitting the teeth to be partly exposed and held against movement.

2. A currycomb provided with teeth, shields for the teeth and means for permitting the teeth to be fully exposed, partly extended or not exposed and held against movement when adjusted.

3. A currycomb having a top plate, a bottom plate, a handle having a connection with the top plate, a movable connection between the plates, means operating upon the movable connection for holding the plates separated and in fixed adjustment, teeth supported by the top plate and shields for the teeth supported by the bottom plate.

4. A currycomb having a top plate, a bottom plate, a handle having a connection with the top plate, teeth supported by the top plate, shields for the teeth supported by the bottom plate, a movable connection between the plates, a pin movable with the bottom plate and provided with an annular groove, and a sliding plate adapted to engage the pin by entering the groove.

5. A currycomb having a top plate, a bottom plate, a handle having a connection with the top plate, teeth supported by the top plate, shields for the teeth supported by the bottom plate, a movable connection between the plates, a pin movable with the bottom plate and provided with two annular grooves, and a sliding plate adapted to engage the pin by entering either of the grooves.

6. A currycomb having a top plate, a bottom plate, a handle having a connection with the top plate, teeth supported by the top plate, shields for the teeth supported by the bottom plate, a plate having a connection with the bottom plate and overspanning the top plate, a pin connecting the bottom plate and overspanning plate, and seated in recesses in both plates, and a sliding plate adapted to engage the pin.

7. A currycomb having a top plate, a bottom plate, a handle having a connection with the top plate, teeth supported by the top plate, shields for the teeth supported by the bottom plate, and two flat springs permanently connected to the top plate and having an engagement with the bottom plate.

8. A currycomb having a top plate, a bottom plate, a handle having a connection with the top plate, teeth supported by the top plate, shields for the teeth supported by the bottom plate, two flat springs, and screws connecting the springs to the top plate, the bottom plate provided with openings through which the screws pass.

9. A currycomb having a top plate provided with two rectangular depressions, and two double-toothed sections, one section located in a depression and held in place therein.

10. A currycomb having a bottom plate stamped from a single piece of sheet material and comprising an edging and a series of raised shields having closed ends.

JOHN Q. ADAMS.
JOHN M. ADAMS.

Witnesses:
   LIONE WHITTEMORE,
   C. B. WHITTEMORE.